United States Patent [19]

Kibler

[11] 4,199,042

[45] Apr. 22, 1980

[54] GOLF CART BRAKE LEVELING MEANS

[75] Inventor: Robert L. Kibler, St. Joseph, Mich.

[73] Assignee: Lambert Brake Corporation, St. Joseph, Mich.

[21] Appl. No.: 956,488

[22] Filed: Nov. 1, 1978

[51] Int. Cl.² ........................................ F16D 55/224
[52] U.S. Cl. .............................. 188/18 A; 188/71.1; 188/73.3
[58] Field of Search ................ 188/18 A, 71.1, 72.1, 188/72.4, 72.7, 72.9, 73.3, 73.4

[56] References Cited

U.S. PATENT DOCUMENTS

| 3,299,991 | 1/1967 | Castelet | 188/71.1 |
|---|---|---|---|
| 3,312,309 | 4/1967 | Sturis | 188/72.4 |
| 3,334,708 | 8/1967 | Swift | 188/72.4 |
| 3,463,274 | 8/1969 | Hollnagel et al. | 188/72.7 |
| 3,708,041 | 1/1973 | Hahn | 188/72.9 |
| 3,853,206 | 12/1974 | Kibler et al. | 188/72.9 |

FOREIGN PATENT DOCUMENTS

1526884 10/1978 United Kingdom .................... 188/73.3

Primary Examiner—Edward R. Kazenske
Attorney, Agent, or Firm—Trexler, Wolters, Bushnell & Fosse, Ltd.

[57] ABSTRACT

A brake unit and a brake unit mounting and leveling device are disclosed. The brake unit includes a U-shaped brake housing and a first friction element affixed to one housing leg. A stator is carried at least partially within the housing and slides on brake mounting bolts which extend through the housing legs. The bolts also extend through a mounting bracket fixed to a vehicle axle housing. A leveler bracket is affixed to the mounting bracket and bears against one housing leg so as to tip the brake unit from a canted position to a position in which the brake friction elements are carried substantially parallel with the brake discs.

2 Claims, 3 Drawing Figures

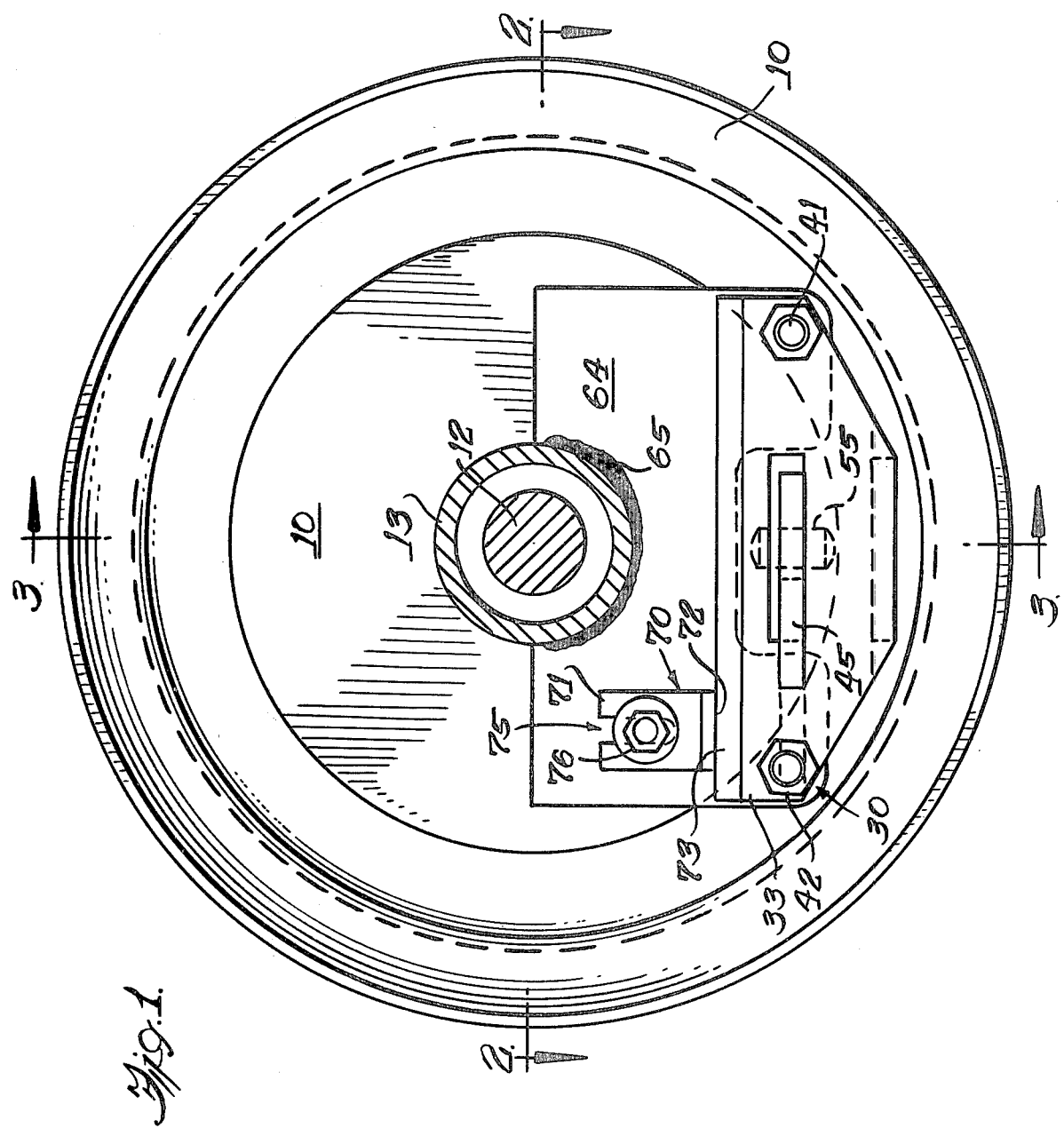

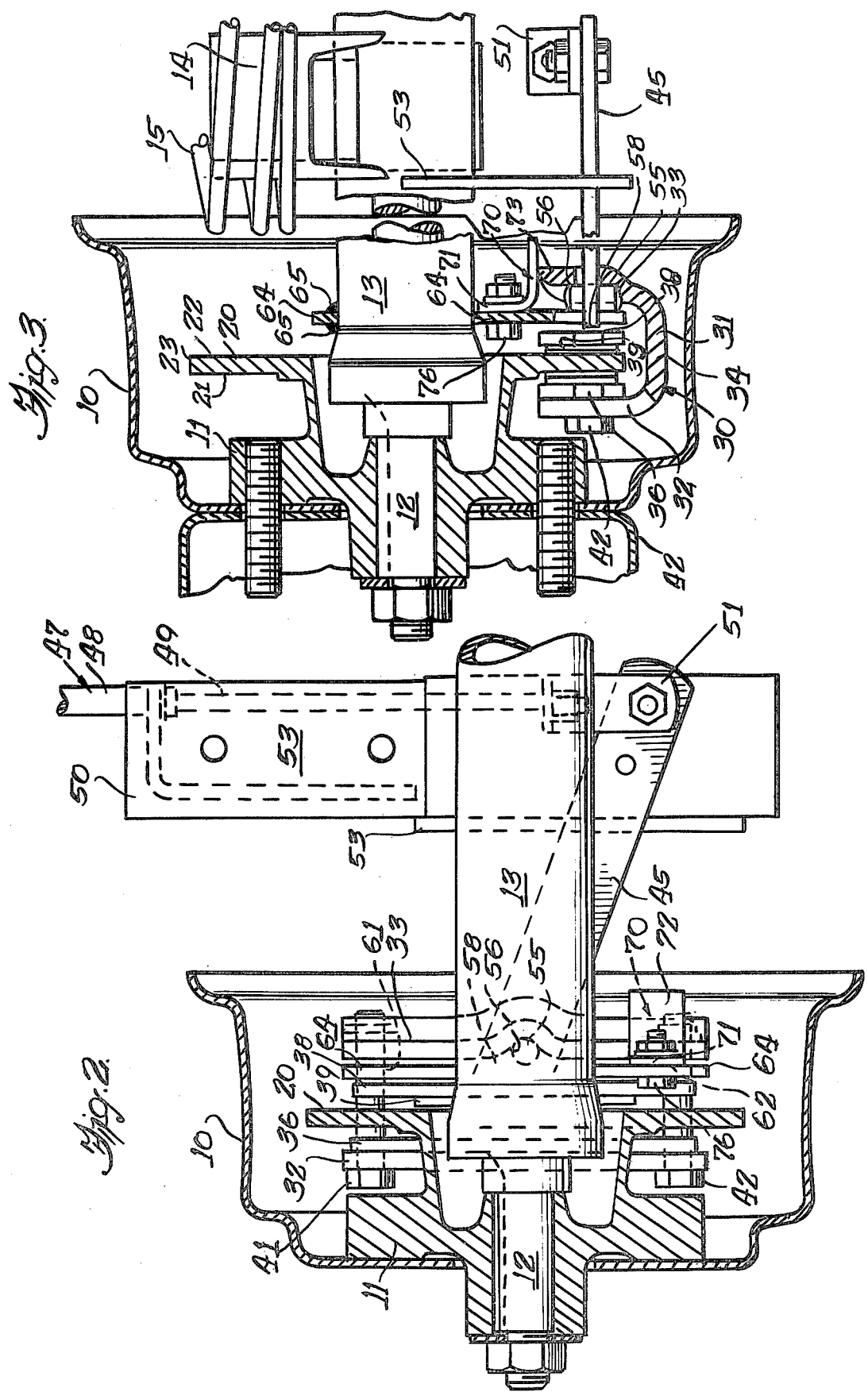

GOLF CART BRAKE LEVELING MEANS

BACKGROUND OF THE INVENTION

This invention relates generally to brakes, and more particularly concerns the installation and use of a caliper-type disc brake.

Brake units of the type disclosed and claimed in U.S. Pat. No. 3,853,206 to Kibler et al have met with marked commercial success. They are highly effective in controlling vehicles such as light recreational vehicles, small garden tractors, riding lawn mowers, and golf carts.

At least some golf cart manufacturers install brakes of this type by extending brake unit assembly bolts through a bracket secured to the vehicle. Over-size bracket apertures are required to permit adequate clearance for various vehicle parts, and to permit the motion of brake unit parts which is necessary to effect proper braking action. Thus, the brake units are not rigidly attached to the bracket and vehicle. Because the brake bolt/bracket aperture support point does not coincide with the brake unit center of gravity, the brake unit tends to tilt with respect to the bracket and other vehicle parts. Under these conditions, the brake unit friction pads may rub against the wheel-mounted brake rotor disc. This rubbing action causes friction pad wear and can at least marginally rob the vehicle of effectively available motive power.

It is the general object of the present invention to provide an inexpensive yet effective caliper disc brake and brake mount device for light vehicles such as golf carts in which this brake drag is minimized or eliminated.

A more specific object is to provide a mounting device for securing a brake unit to a vehicle so that brake drag and consequent wear and motive power loss are minimized or eliminated. A similar object is to provide a simple, easily-installed mounting device for securing a disc brake unit to a vehicle so that brake unit friction pad drag and consequent wear against a wheel-mounted brake disc are minimized or eliminated.

Yet more specifically, it is an object to provide an inexpensive, yet positive and reliable mounting system for attaching a caliper disc brake to a brake mounting bracket so as to align the brake unit with a wheel-carried disc, and thus prevent or at least minimize unwanted rubbing action between brake unit friction pads and the brake disc.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view showing a vehicle wheel, axle, brake unit for engaging the vehicle wheel, and parts of the brake mounting device;

FIG. 2 is a sectional view taken substantially in the plane of line 2—2 in FIG. 1 and looking generally downward from a position atop the brake unit, and showing the novel brake unit mounting device, vehicle axle, and a bottom portion of a vehicle wheel hub; and FIG. 3 is a sectional view taken substantially in the planes of line 3—3 in FIG. 1 and showing the vehicle wheel hub, the brake unit and associated mounting and other structure from a generally side elevational position.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

More specifically, the drawings show a vehicle wheel 10 mounted upon a wheel hub 11. The hub 11 is secured to a vehicle axle 12 which is at least partially carried within an axle housing 13. As shown particularly in FIG. 3, this axle housing 13 can be engaged by a suspension foot 14 which is, in turn, appropriately attached to vehicle suspension devices not shown. A suspension spring 15 here surrounds the base 14. A vehicle tire (not shown) is, of course, mounted upon the vehicle wheel 10.

The mechanism illustrated here includes a caliper-type disc brake; a brake unit disc 20 is, in the illustrated embodiment, formed integrally with the wheel hub 11 and extends in a generally radially outward direction from the vehicle axle 12 and axle housing 13. The brake disc 20 is defined by opposed faces 21 and 22 and a disc periphery 23.

A caliper disc brake unit 30 of the spot type is mounted to surround the brake disc faces 21 and 22 and to overlie the brake disc periphery 23 at a given location. This brake unit 30 includes a bi-legged, U-shaped brake housing 31 which can be considered to include generally opposed legs 32 and 33 joined by a bight portion 34. Upon one leg 32 is secured a first brake friction pad 36 formed of appropriate material. A stator member 38 mounts a second friction pad 39 in opposed relation to the first friction pad 36 for engaging, respectively, the opposite sides 21 and 22 of the interposed brake disc 20.

As can be envisioned from FIG. 2, this stator member 38 is mounted for translational sliding motion upon bolts 41 and 42. When braking action is desired, a brake actuator level 45 is rotated into a brake-energized position in a counter-clockwise direction, as illustrated in FIG. 2. This lever rotation can be accomplished by any convenient means such as a bowden cable device 47 having a sheath 48 from which extends a cable member 49. The cable sheath 48 can be secured to an appropriate mount 50; the cable 49 can be attached to the lever 45 by an attachment angle member 51. If desired, a splash guard 53 can be mounted to the axle housing 13 in depending relationship so as to discourage mud or other corruption from reaching this angle bracket 51 and the associated bowden cable 47. When the bowden cable 47 is appropriately actuated, the brake actuator lever 45 pivots about a pivot pin 55 carried in a groove 56 in the brake housing leg 33. When lever rotation occurs, a lever end 58 engages the stator 38 and drives the stator to the left as shown in FIGS. 2 and 3 so as to cause stator brake pad 39 engagement with the opposed brake disc face 22. Simultaneously, the reaction of the pivot pin 55 against the housing leg 33 draws the entire housing 30 in an opposite direction. Thus, the brake pad 36 is pulled into engagement with the opposite brake disc face 21. A pinching, braking action is thus applied to the brake disc 20 and, consequently, retarding action is applied to the wheel 10.

To attach this brake unit 30 to the vehicle, the brake unit bolts 41 and 42 are passed through apertures 61 and 62 in a mounting bracket 64. To permit the proper movement of the stator 38 and countermovement of the housing 30, these apertures 61 and 62 are slightly oversized; that is, the apertures are sufficiently large to permit brake unit 30 and bolt 41 and 42 motion with respect to the depending brake mounting bracket 64. The bracket 64 is itself rigidly secured to the axle housing 13 as by weldments 65 or other convenient means. Under these conditions, it can be envisioned that the brake unit 30 may tend to droop into a canted position, and the brake pads 36 and 39 might consequently tend to rub against the disc 20.

In accordance with the invention, the brake unit 30 is aligned with the brake disc 20 so as to urge the brake friction pads 36 and 39 into generally parallel alignment with the respective disc faces 21 and 22 and minimize or eliminate pad rubbing and consequent wear. To this end, a leveler bracket 70 is secured to the mounting bracket 64. Here, the leveler bracket 70 takes the form of an angle having a first leg 71 secured against the mounting bracket 64 directly, and a second leg 72 which extends outwardly so as to engage the tip 73 of one housing leg 33. As viewed in FIG. 3, this leveler bracket leg 72 tends to bear against and force downwardly the tip 73 of the housing bracket leg 33 and, consequently, urge the brake unit 30 to be rotated in a clock-wise direction from a canted position to the illustrated non-rubbing or level position.

In carrying out the invention, the leveler bracket 70 is provided with an extended aperture 75 formed to accommodate a threaded mounting bolt 76 so that the leveler bracket 70 can be secured to the mounting bracket 64 in any one of a range of positions. In this way, relatively precise adjustment of the brake unit 30 and leveler bracket 70 can be obtained at relatively low cost when the entire mechanism is assembled.

The invention is claimed as follows:

1. A brake and brake leveler suspended below a vehicle axle housing, comprising, in combination, a mounting bracket fixed to and extending downwardly from the axle housing, a bi-legged U-shaped brake housing having upwardly extending first and second opposed legs each terminating in a distal end and an intermediate bight portion therebetween, for partially surrounding a brake disc, a plurality of mounting bolts extending from the first brake housing leg and loosely through the mounting bracket to the second brake housing leg, the loose interengagement between the mounting bolts and the mounting bracket permitting the brake to move to a canted position relative to the mounting bracket, a first friction element affixed to one housing leg for engaging one side of the brake disc, a stator carried at least partially within the housing and slidably carried on the mounting bolts and mounting a second friction element for engaging an opposite side of the brake disc, actuator means connected to the housing and to the stator for drawing the housing in a given direction to urge the first friction element into disc engagement while driving the stator in an opposite direction to urge the second friction element into disc engagement, and an L-shaped leveler bracket having one leg affixed to the mounting bracket and the other leg extending parallel to said axle housing to frictionally bear downwardly against the distal end of one housing leg so as to tip the brake housing around the mounting bracket-mounting bolt engagement points from the canted position into a position in which the brake friction elements are carried substantially parallel with the brake disc, at least one of said mounting bracket and said leveler bracket defining at least one mounting aperture, the combination further including fastener means extending through the mounting aperture and engaging the other one of said mounting bracket and said leveler bracket for securing the leveler bracket to the mounting bracket at any one of a range of positions so as to adjustably locate the leveler bracket relative to the brake housing to properly tip and locate the brake housing.

2. A brake suspension system according to claim 1 wherein said fastener means comprises at least one threaded bolt member.

* * * * *